(12) United States Patent
Riegler

(10) Patent No.: US 9,350,214 B2
(45) Date of Patent: May 24, 2016

(54) ACTUATOR

(75) Inventor: Ernst Riegler, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 30 days.

(21) Appl. No.: 13/990,290

(22) PCT Filed: Nov. 10, 2011

(86) PCT No.: PCT/EP2011/069823
§ 371 (c)(1),
(2), (4) Date: Aug. 2, 2013

(87) PCT Pub. No.: WO2012/072394
PCT Pub. Date: Jun. 7, 2012

(65) Prior Publication Data
US 2014/0062237 A1    Mar. 6, 2014

(30) Foreign Application Priority Data

Nov. 30, 2010  (DE) .......................... 10 2010 052 954

(51) Int. Cl.
| | |
|---|---|
| H02K 7/102 | (2006.01) |
| F16D 43/21 | (2006.01) |
| F16D 55/02 | (2006.01) |
| F16D 67/00 | (2006.01) |
| H02K 7/00 | (2006.01) |
| F16D 65/02 | (2006.01) |
| F16D 55/00 | (2006.01) |
| F16D 125/38 | (2012.01) |
| F16D 127/00 | (2012.01) |

(52) U.S. Cl.
CPC ................ *H02K 7/102* (2013.01); *F16D 55/02* (2013.01); *F16D 67/00* (2013.01); *H02K 7/003* (2013.01); *F16D 2055/0058* (2013.01); *F16D 2065/024* (2013.01); *F16D 2125/38* (2013.01); *F16D 2127/001* (2013.01)

(58) Field of Classification Search
CPC ....................... F16D 2125/38; F16D 2127/001
USPC .......................................... 192/223.2, 223.3
See application file for complete search history.

(56) References Cited

U.S. PATENT DOCUMENTS

| | | | | |
|---|---|---|---|---|
| 1,414,000 | A | * | 4/1922 | Todd ............................... 188/69 |
| 3,667,578 | A | * | 6/1972 | Johnson ..................... 192/223.3 |
| 3,844,387 | A | | 10/1974 | Morokoshi |
| 4,352,266 | A | * | 10/1982 | Lloyd et al. ..................... 56/11.3 |
| 4,909,363 | A | * | 3/1990 | Trommer ................... 192/223.3 |
| 6,464,061 | B1 | * | 10/2002 | Inoue et al. ................. 192/223.3 |
| 2007/0158160 | A1 | * | 7/2007 | Puiu ........................... 192/70.23 |
| 2009/0277726 | A1 | * | 11/2009 | Wasser ......................... 188/71.2 |

FOREIGN PATENT DOCUMENTS

| | | |
|---|---|---|
| CN | 2345395 Y | 10/1999 |
| EP | 0 800 261 A1 * | 10/1997 |

OTHER PUBLICATIONS

Translation of FR 2194265, Feb. 22, 1974, Marche Roche ETS.

* cited by examiner

*Primary Examiner* — Colby M Hansen
(74) *Attorney, Agent, or Firm* — Jordan IP Law, LLC; Todd A. Vaughn

(57) ABSTRACT

An actuator has a drive element and an output element each rotatable about a rotation axis, and a coupling device which couples the drive element to the output element to form a torsion backlash.

20 Claims, 2 Drawing Sheets

ACTUATOR

CROSS-REFERENCE TO RELATED APPLICATIONS

The present application is a National Stage application of PCT International Application No. PCT/EP2011/069823 (filed on Nov. 10, 2011), under 35 U.S.C. §371, which claims priority to German Patent Application No. DE 10 2010 052 954.0 (filed on Nov. 30, 2010), which are each hereby incorporated by reference in their respective entireties.

TECHNICAL FIELD

The present invention relates to an actuator having a drive element which can be rotated about a rotation axis, an output element which can be rotated about the rotation axis and a coupling device by means of which the drive element is coupled to the output element with a torsion backlash being formed.

BACKGROUND

Rotating actuators are used in a large number of devices. Often, in a non-activated state of the actuator, undesirable torsion of the output element must be prevented. In principle, this could be carried out by means of an additional actuator, for example, an electromagnetic brake. However, such an additional actuator is linked with undesirable costs and weight. A self-locking member could also be provided in the drive chain of the actuator, for example, a trapezoidal thread spindle. Such a self-locking member, however, impairs the overall level of efficiency of the actuator.

SUMMARY

An object of the invention is to provide an actuator of the type mentioned in the introduction, which is prevented from becoming twisted in a non-activated state in a simple, cost-effective and reliable manner.

This object is achieved with an actuator, having: a drive element which can be rotated about a rotation axis an output element which can be rotated about the rotation axis and a coupling device by means of which the drive element is coupled to the output element with a torsion backlash being formed, wherein the coupling device comprises a transmission element which is coupled to the output element in a rotationally secure manner and which can be displaced with respect to the output element between a rest position and an operating position, wherein the transmission element is secured against torsion in the rest position by means of a brake device and can be rotated about the rotation axis in the operating position, wherein the transmission element is pretensioned into the rest position by means of a resilient device, wherein the coupling device is constructed in such a manner that, starting from the rest position of the transmission element, by means of an initial rotation movement of the drive element, using the torsion backlash, the transmission element can be displaced into the operating position counter to the resilient pretensioning, and that, after the operating position has been reached, the transmission element can be driven to carry out a rotation movement by means of an additional rotation movement of the drive element in order thereby to also drive the output element to carry out a rotation movement.

In accordance with the invention, the coupling device comprises a transmission element which is coupled to the output element in a rotationally secure manner and which can be displaced with respect to the output element between a rest position and an operating position, the transmission element being secured against torsion in the rest position by means of a brake device and being able to be rotated about the rotation axis in the operating position, and the transmission element being pretensioned into the rest position by means of a resilient device. The coupling device is constructed in such a manner that, starting from the rest position of the transmission element, by means of an initial rotation movement of the drive element, using the torsion backlash, the transmission element can be displaced into the operating position counter to the resilient pretensioning and, after the operating position has been reached, the transmission element can be driven to carry out a rotation movement by means of an additional rotation movement of the drive element in order thereby to also drive the output element to carry out a rotation movement.

The coupling device, with, for example, an axial or a radial, relative movement of the drive element and the transmission element being brought about, allows a limited rotation movement of the drive element relative to the transmission element. When the actuator is actuated, a two-phase movement sequence is thereby brought about. During an initial first movement phase, a maximum of a portion of the rotation movement of the drive element is converted into a rotation movement of the transmission element. Furthermore, however, the rotation movement of the drive element is used to selectively release or secure the brake device. The output element is stationary in this instance as long as the torsion backlash between the drive element and the output element is used. During a subsequent second movement phase, a torque transmission from the drive element to the output element via the transmission element is carried out in the conventional manner. During this torque transmission, no undesirable occurrences of friction resistance have to be overcome owing to self-locking drive members.

When the actuator is activated, therefore, the transmission element is first moved into the operating position, with the brake device being released, and subsequently the conventional driven rotation movement of the output element is carried out, in a manner corresponding to the desired function of the actuator.

Owing to the pretensioning, the actuator automatically assumes the torsion-secure rest position when it is in a non-activated state, that is to say, for example, an associated exciter coil is not supplied with current. An undesirable torsion movement is reliably prevented in this rest position. Owing to the invention, undesirable further rotation of the actuator in the non-activated state can consequently be prevented without necessarily having to provide a specific device which has to be actuated separately for this purpose.

Developments of the invention are set out in the dependent claims, the description and the appended drawings.

The coupling device may comprise at least one roller member, by means of which the drive element cooperates with the transmission element during the initial rotation movement. Such a roller member, such as a cylindrical roller or a ball, enables a movement transmission between the drive element and transmission element with a high level of efficiency.

The coupling device may further be constructed so that the transmission element is repelled by the drive element counter to the resilient pretensioning during the initial rotation movement of the drive element. For reliable support of the transmission element or the roller member, the drive element may be supported in a housing of the actuator, in particular in an axially secure manner.

In accordance with a preferred embodiment, the coupling device has a redirection device which redirects the initial rotation movement of the drive element at least partially into an axial and/or radial movement of the transmission element. This axial and/or radial movement of the transmission element can be used to release or secure the brake device. In particular, the redirection device may be constructed in such a manner that the rotation movement of the drive element is ultimately converted into a helical movement of the transmission element (axial helixes or radial helixes).

The redirection device may comprise at least one ramp. That is to say, there may be provided on the drive element and/or on the transmission element a region which has a surface inclined with respect to the rotation axis relative to a normal plane and on which, for example, one or more roller members roll. Alternatively, the radius of the ramp with respect to the rotation axis may also change in the peripheral direction. In particular, there may also be provided a pair of two mutually opposing ramps which co-operate preferably by means of one or more roller members in order to thus convert the initial rotation movement of the drive element into a radial or axial movement of the transmission element.

The coupling device may comprise at least one stop by means of which the drive element cooperates with the transmission element during the additional rotation movement. For example, a roller member rolling on a ramp, after the initial rotation movement is complete, may strike a wall portion of the drive element or the transmission element. The stop marks the transition from the initial rotation movement to the additional rotation movement, the additional rotation movement of the drive element being transmitted directly and immediately to the transmission element and consequently to the output element owing to the stop. A reliable torque transmission from the drive element to the output element is thereby possible. Owing to the stop(s), the mentioned torsion backlash, that is to say, the possible rotation movement of the drive element relative to the transmission element, is limited. For example, after completion of the initial rotation movement, a roller member may be in abutment, on the one hand, with a stop of the drive element and, on the other hand, with a stop of the transmission element, or the stop of the drive element may be directly in abutment with a stop of the transmission element.

Furthermore, the coupling device may be constructed in such a manner that, after the additional rotation movement of the drive element has been stopped, the transmission element is displaced back into the rest position owing to the resilient pretensioning. In particular, the embodiment may be such that either the transmission element together with the output element or the drive element carries out a compensation rotation movement, that is to say, the restoring movement of the transmission element into the torsion-secure rest position is carried out with the torsion backlash between the drive element and the output element being reproduced. The torsion backlash which has been reproduced can then be used again during the corresponding initial rotation movement when the actuator is subsequently actuated.

The coupling device may further be effective in different manners for various rotation directions of the drive element. Efficiency which is dependent on the rotation direction can thereby be achieved. For example, instead of a symmetrical, for example, V-shaped, ramp, an asymmetrical ramp may be provided.

In accordance with an embodiment of the invention, the brake device is arranged in a stationary manner. For example, the brake device may be fixed in a housing of the actuator. In the operating position, the transmission element is released from the brake device and can consequently move freely.

The brake device may comprise a friction device which preferably has a conical or flat operating face, or the brake device may comprise a positive-locking brake. For example, a conical operating face may be formed directly on the transmission element which cooperates with a corresponding conical operating face of a brake element which is secured to the housing. Such a conical brake has a particularly simple and space-saving structure. As long as sufficient structural space is available, a friction device with a flat operating face may also be provided in order to reduce the production costs. A positive-locking brake enables particularly large braking forces, which may be necessary in many applications.

In accordance with another embodiment of the invention, the drive element and the output element are supported in an axially fixed manner.

The output element may further be constructed as a shaft, which is preferably rotatably supported on the drive element. The transmission element may in contrast be supported on the output element in an axially movable manner, for example, by means of a plug type tooth arrangement. For the drive element and the output element, it is consequently not necessary to provide any complex bearings which enable axial movability.

The resilient device may further be effective between the output element and the transmission element. The resilient device may comprise at least one pressure spring and/or be effective in an axial direction. For example, a plate spring may be arranged between the output element and the transmission element. In one embodiment with an initial movement of the transmission element in the form of a radial helix, a torsion spring may be provided for a rotationally resilient coupling or a radially effective spring.

The drive element and/or the transmission element may be formed as a shaped sheet metal component, whereby a particularly simple and cost-effective production is enabled.

DRAWINGS

The invention is described below by way of example with reference to the drawings.

DESCRIPTION

Figure 1:
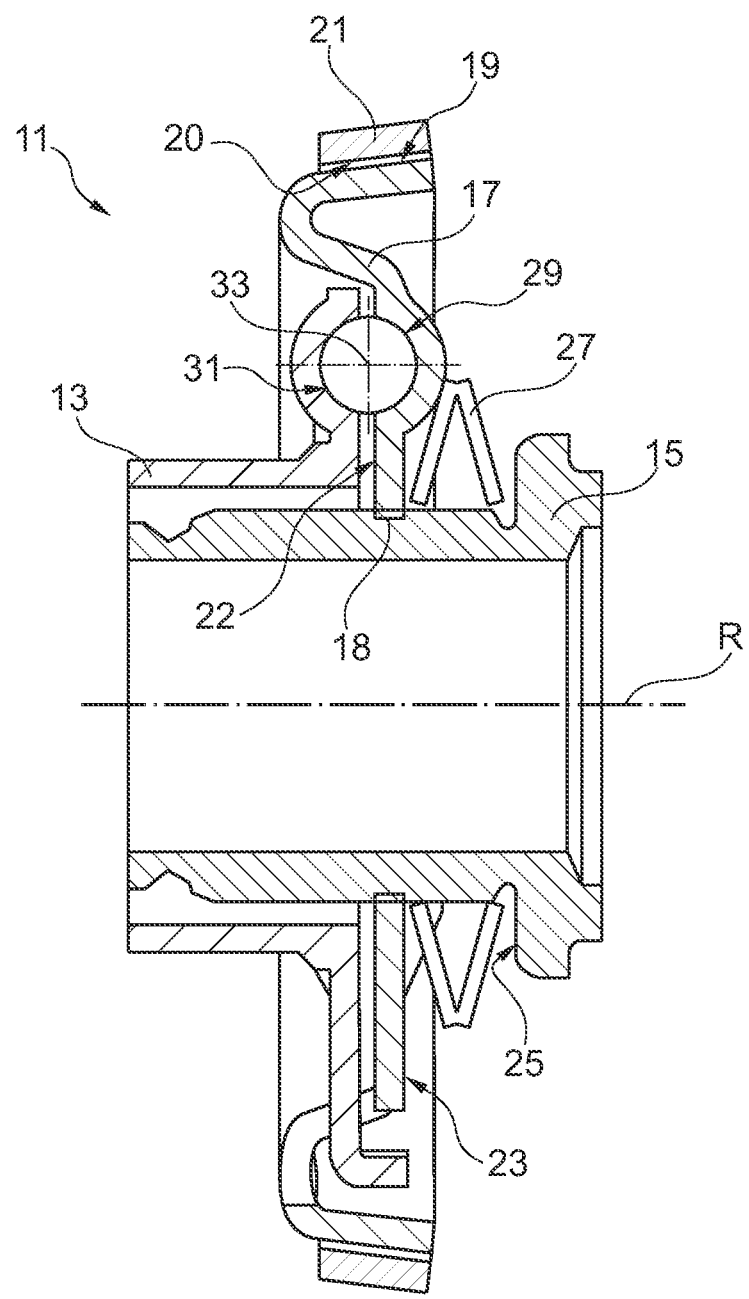
FIG. 1 illustrates a sectioned view of an actuator in accordance with the invention.
Figure 2:
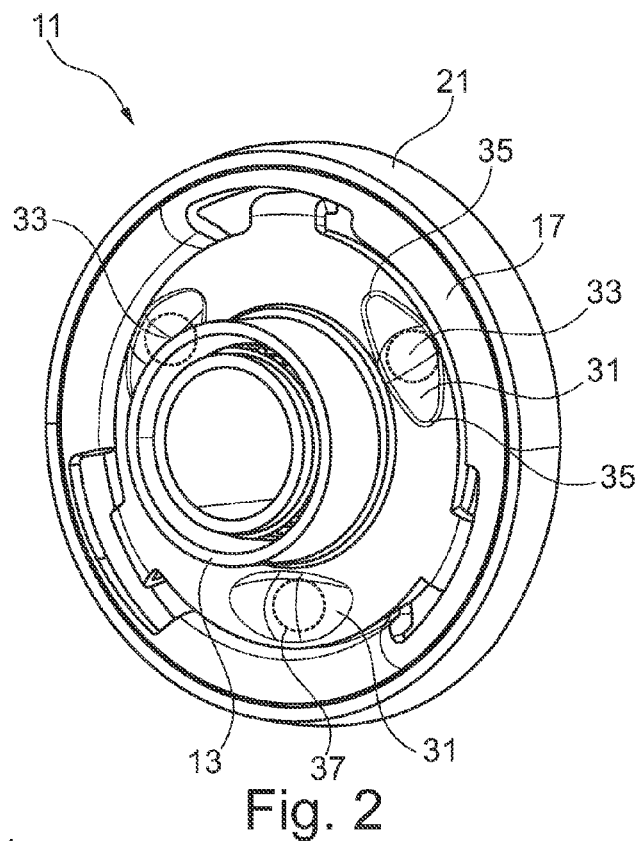
FIG. 2 illustrates a perspective front view of the actuator in accordance with FIG. 1.
Figure 3:
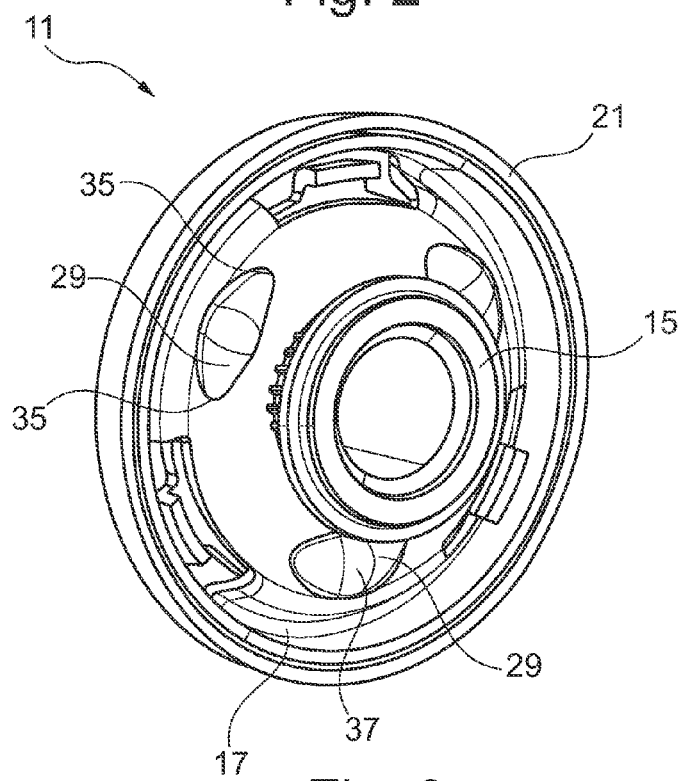
FIG. 3 illustrates a perspective rear view of the actuator in accordance with FIG. 2.

In accordance with FIGS. 1 to 3, an actuator 11 comprises a drive element 13 and an output element 15, which are constructed in the manner of a hollow shaft and which are rotatably supported about a common rotation axis R in a non-illustrated housing of the actuator 11. In an axial direction, both the drive element 13 and the output element 15 are fixed in the housing. An annular transmission element 17 is located on the output element 15 and is supported thereon by means of a plug type tooth arrangement 18 in a rotationally secure, but axially displaceable manner. The transmission element 17 can consequently be moved in the direction of the rotation axis R between a rest position illustrated in FIG. 1 and an operating position not shown in FIG. 1 and located further to the right. On an outer peripheral face of the transmission element 17, there is formed an outer cone 19 which in the rest position cooperates with the inner cone 20 of a brake ring 21 which is secured to the housing in such a manner that the transmission element 17 is secured against torsion in the rest position by the action of friction between the outer cone 19 and the inner cone 20. If required by the application, a friction device with a flat operating face or a positive-locking brake can also be provided in place of the cone mechanism.

Between an output-side end face 23 of the transmission element 17 and a shoulder 25 formed on the output element 15, there is arranged a spring 27 which is active under pressure and which pretensions the transmission element 17 relative to the output element 15 into the rest position.

At an input-side end face 22 of the transmission element 17, there is formed a ball ramp 29 which is opposite a ball ramp 31 of the drive element 13. As can be seen from FIGS. 2 and 3, there are provided a total of three balls 33 which are arranged in a state distributed in a uniform manner over the periphery of the transmission element 17 and which are positioned between the ball ramp 29 of the transmission element 17 and the ball ramp 31 of the drive element 13. The relatively short ball ramps 29, 31 extend with respect to the rotation axis R in a peripheral direction and terminate with respective stops 35. In the embodiment illustrated, the ball ramps 29, 31 extend symmetrically when viewed in the peripheral direction.

In the event of relative torsion between the transmission element 17 and the output element 15 about the rotation axis R, the balls 33 may roll on the ball ramps 29, 31 as long as they are not clamped between two respective stops 35. The balls 33 form, in conjunction with the ball ramps 29, 31, a mechanism for coupling the drive element 13 and the output element 15, which will be explained in greater detail below.

As long as the actuator 11 is not activated and there is therefore no torque on the drive element 13, the spring 27 presses the transmission element 17 into the rest position which is illustrated in FIG. 1 and in which the transmission element 17 is secured against torsion by frictional engagement between the outer cone 19 and the inner cone 20. In this rest position, undesirable actuator rotation is prevented. The balls 33 are located at a respective apex location 37 of the ball ramps 29, 31.

If the actuator 11 is now actuated and there is consequently a torque at the drive element 13, a subsequently occurring rotation movement of the drive element 13 is converted by means of the ball ramp mechanism into a combined movement of the transmission element 17, which comprises both an axial and a radial component. For example, the ball ramps 29, 31 may define an axially helical path. Owing to the axial movement component, the transmission element 17 is first moved from the rest position illustrated in FIG. 1 into an operating position located further to the right, in which the outer cone 19 of the transmission element 17 is released from the inner cone 20 of the brake ring 21 and the transmission element 17 can consequently rotate freely. In this first movement phase, the ball ramps 29, 31 and the balls 33 which are guided therein therefore act as a redirection device in order to redirect the rotation movement of the drive element 13 into an axial movement of the transmission element 17. Torsion backlash present between the drive element 13 and the output element 15 is used. The first movement phase of the transmission element 17 is ended as soon as the balls 33 strike the respective stops 35 of the ball ramps 29, 31.

As soon as this is the case, the balls 33 no longer roll and rotationally secure coupling is produced between the drive element 13 and the transmission element 17 in the corresponding rotation direction, and consequently also with the output element 15. The drive element 13 consequently drives, via the balls 33 and the transmission element 17, the output element 15 to carry out a desired rotation movement of the actuator 11 (second movement phase). Particular friction resistances do not have to be overcome in this instance. Since the transmission element 17 has already reached its operating position in this movement phase, no further brake power is applied to the transmission element 17 by the brake ring 21.

If the actuator 11 is deactivated starting from the operating position of the transmission element 17 and there is consequently no longer any torque at the drive element 13, the spring 27 presses the transmission element 17 back into the torsion-secure rest position, with either the transmission element 17 together with the output element 15 or the drive element 13 (or both) carrying out a compensation rotation movement, whilst the balls 33 roll in an opposite direction to the previous rotation direction on the ball ramps 29, 31 in the direction towards the respective apex 37. The torsion backlash between the drive element 13 and the output element 15 is reproduced by this compensation movement. The actuator 11 is now in turn secured against undesirable torsion by means of the brake ring 21 which is secured to the housing and at the same time ready for repeated activation.

If a movement path which is dependent on the direction of rotation is desired, the ball ramps 29, 31 may also deviate from the symmetrical shape illustrated in FIGS. 2 and 3.

In principle, in addition to the brake device formed by the transmission element 17 and the brake ring 21, a self-locking transmission member which acts between the drive element 13 and the output element 15 may be provided in order to reliably prevent undesirable torsion of the actuator 11, for example, in the event of oscillations.

On the whole, simple and reliable torsion prevention of an actuator 11 in the non-activated state can be provided using the invention, for which in particular no actuation device which has to be individually controlled is required.

LIST OF REFERENCE SIGNS

11 Actuator
13 Drive element
15 Output element
17 Transmission element
18 Plug type tooth arrangement
19 Outer cone
20 Inner cone
21 Brake ring
22 Input-side end face
23 Output-side end face
25 Shoulder
27 Spring
29 Ball ramp of the transmission element
31 Ball ramp of the drive element
33 Ball
35 Stop
37 Apex
R Rotation axis

What is claimed is:
1. An actuator, comprising:
a drive element rotatable about a rotation axis;
an output element rotatable about the rotation axis;
a coupling device which couples the drive element to the output element to create a torsional force, the coupling device including a transmission element rotatably coupled to the output element, and which is axially displaceable with respect to the output element between a rest position and an operating position in which the transmission element is rotatable about the rotation axis, wherein the transmission element is radially displaceable with respect to the drive element;

a brake device, secured to a housing of the actuator, and which secures the transmission element against torsion in the rest position; and a resilient device which pretensions the transmission element into the rest position, and which applies a direct force between the output element, the transmission element, at least one roller member, and the drive element, wherein the coupling device is configured such that, starting from the rest position of the transmission element, by way of an initial rotation movement of the drive element, using a torsional backlash, the transmission element is displaceable into the operating position counter to the pretensioning by the resilient device, and after the transmission element reaches the operating position, the transmission element is configured to be driven by the drive element in a radial direction to carry out a rotation movement by way of an additional rotation movement of the drive element in order thereby to also drive the output element to carry out a rotation movement, wherein the resilient device is configured to provide a force between the output element and the transmission element.

2. The actuator of claim 1, wherein the coupling device comprises the at least one roller member through which the drive element cooperates with the transmission element during the initial rotation movement.

3. The actuator of claim 1, wherein the coupling device is configured such that the transmission element is repelled by the drive element counter to the resilient pretensioning during the initial rotation movement of the drive element.

4. The actuator of claim 1, wherein the coupling device has a redirection device which redirects the initial rotation movement of the drive element into an axial and/or radial movement of the transmission element.

5. The actuator of claim 4, wherein the redirection device comprises at least one ramp.

6. The actuator of claim 1, wherein the coupling device comprises at least one stop through which the drive element cooperates with the transmission element during the additional rotation movement.

7. The actuator of claim 1, wherein the coupling device is configured such that, after the additional rotation movement of the drive element ceased, the transmission element may be displaced back into the rest position by way of the resilient pretensioning.

8. The actuator of claim 1, wherein the coupling device is effective in different manners for various rotation directions of the drive element.

9. The actuator of claim 1, wherein the brake device is arranged in a stationary manner.

10. The actuator of claim 1, wherein the brake device comprises a friction device which has a conical operating face.

11. The actuator of claim 1, wherein the brake device comprises a friction device which has a flat operating face.

12. The actuator of claim 1, wherein the brake device comprises a positive-locking brake.

13. The actuator of claim 1, wherein the drive element and the output element are supported in an axially fixed manner.

14. The actuator of claim 13, wherein the output element comprises a shaft rotatably supported on the drive element.

15. The actuator of claim 1, wherein the output element comprises a shaft rotatably supported on the drive element.

16. The actuator of claim 1, wherein the transmission element is supported on the output element in an axially movable manner.

17. The actuator of claim 1, wherein:
the resilient device comprises a spring and is configured to provide the force in an axial direction.

18. The actuator of claim 1, wherein the resilient device comprises a spring and is configured to provide a force in an axial direction.

19. The actuator of claim 1, wherein the drive element and/or the transmission element is formed as a shaped sheet metal component.

20. An actuator, comprising:
a drive element rotatable about a rotation axis;
an output element rotatable about the rotation axis;
a coupling device to couple the drive element to the output element and which includes:
  a transmission element having an outer cone on an outer peripheral face thereof, and which is located in a rotationally secure and axially displaceable manner on the output element between a rest position in which the actuator is deactivated and the transmission element is secured against torsion, and an operating position in which the actuator is activated and the transmission element is at least axially moveable relative to the output element;
  at least one roller member positioned for guided movement between the transmission element the drive element in order to convert the rotational movement of the drive element into an axial movement and a radial movement of the transmission element,
a resilient device which pretensions the transmission element into the rest position, and which applies a direct force between the output element, the transmission element, the at least one roller member, and the drive element; and
a brake device having an inner cone which, in the rest position of the transmission element, engages the outer cone to secure the transmission element against torsion in the rest position.

* * * * *